United States Patent [19]

Gramckow et al.

[11] Patent Number: 5,513,097
[45] Date of Patent: Apr. 30, 1996

[54] METHOD AND CONTROL DEVICE FOR CONTROLLING A PROCESS INCLUDING THE USE OF A NEURAL NETWORK HAVING VARIABLE NETWORK PARAMETERS

[75] Inventors: Otto Gramckow, Erlangen; Thomas Martinetz; Thomas Poppe, both of München, all of Germany

[73] Assignee: Siemens Aktiengesellschaft, München, Germany

[21] Appl. No.: 243,646

[22] Filed: May 16, 1994

[30] Foreign Application Priority Data

May 17, 1993 [EP] European Pat. Off. ............ 93108017

[51] Int. Cl.⁶ .................................................. G05B 13/02
[52] U.S. Cl. ............................ 364/148; 395/903; 395/904
[58] Field of Search ................................. 364/148–151; 395/20–27, 902–918

[56] References Cited

U.S. PATENT DOCUMENTS

| | | | |
|---|---|---|---|
| 4,990,838 | 2/1991 | Kawato et al. | 395/22 |
| 5,159,660 | 10/1992 | Lu et al. | 395/906 |
| 5,175,678 | 12/1992 | Frerichs et al. | 364/148 |
| 5,220,373 | 6/1993 | Kanaya | 395/22 |
| 5,259,064 | 11/1993 | Foruta et al. | 395/22 |
| 5,303,328 | 4/1994 | Masui et al. | 395/23 |
| 5,305,230 | 4/1994 | Matsumoto et al. | 364/149 |
| 5,353,207 | 10/1994 | Keeler et al. | 364/148 |

FOREIGN PATENT DOCUMENTS

| | | |
|---|---|---|
| 0460892 | 12/1991 | European Pat. Off. . |
| 0531712 | 3/1993 | European Pat. Off. . |
| 4008510 | 9/1990 | Germany . |
| 4131765 | 3/1993 | Germany . |
| 0534221 | 3/1993 | Germany . |
| WO90/10270 | 9/1990 | WIPO . |

OTHER PUBLICATIONS

Demetri–Psaltis et al, "A Multilayered Neural Network Controller" pp. 17–21, 1988.
IEE Proceedings D. Control Theory & Applications, vol. 138, No. 5, Sep. 1991, Stevenage, GB, pp. 431–438; K. Hunt et al.: *Neural Networks for Nonlinear Internal Model Control*.
Patent Abstracts of Japan, vol. 16, No. 467, 29 Sep. 1992 & JP–A–41 67 908 (Toshiba) 16 Jun. 1992.
Patent Abstracts of Japan, vol. 16, No. 515, 23 Oct. 1992 & JP–A–41 90 910 (Toshiba) 9 Jul. 1992.
Neural Computation 1, pp. 281–294 (1989), MIT; John Moody et al.: *Fast Learning in Networks of Locally–Tuned Processing Units*.

Primary Examiner—James P. Trammell
Attorney, Agent, or Firm—Kenyon & Kenyon

[57] ABSTRACT

For the control of a process in a controlled system, a presetting of the system takes place at the start of each process sequence as a function of a precalculated process parameter which exhibits a system-induced dependence on faulty input variables. In this case, the description of the dependence takes place by a model of the process which is adapted during the course of the process. To prevent dependence on the creation of models, which as a rule are imprecise, the input variables are fed before the start of the process to a neural network having variable network parameters for the precalculation of the process parameter based on measurements of the input variables and of the process parameter. These variables are recalculated during the course of the process and utilized for the adaptation of the network parameters.

15 Claims, 2 Drawing Sheets

METHOD AND CONTROL DEVICE FOR CONTROLLING A PROCESS INCLUDING THE USE OF A NEURAL NETWORK HAVING VARIABLE NETWORK PARAMETERS

BACKGROUND OF THE INVENTION

The present invention relates to a method and control device for controlling a process in a controlled system wherein, at the start of each process sequence, a pre-setting of the system takes place as a function of a precalculated process parameter which exhibits a dependence on faulty input variables, where the dependence is inherent in the system.

In German Patent No. DE-A-41 31 765, the disclosure of which is hereby incorporated by reference in its entirety, a method and control device for controlling a process in an industrial plant, for instance a mill train, is shown. The actual control variable, namely the thickness of the rolling stock emerging from the plant cannot be measured in the roll gap (nip), but can be detected only indirectly as a function of the manipulated variable, in this case the positioning in the corresponding roll stand, and one or more process parameters (e.g, the rolling force). During the process sequence, the rolling force can be measured so that the actual value of the manipulated variable can be calculated at any time and thus can be fed to the control for generating the manipulated variable. In the initial phase of each process sequence (i.e. at the start of each individual rolling process) the control, however, must first go through a building up process which leads to defective thicknesses in the initial region of the rolling stock. To minimize this build-up phase of the control and thus minimize the possibility that the initial region of the rolling stock has a defective thickness, prior to the entrance of the rolling stock into the mill train, a pre-setting of the manipulated variables takes place in this method as a function of a setpoint value for the control variable (rolling stock thickness) and a precalculated value for the process parameter (rolling force). The precalculation of the rolling force takes place in this connection with a mathematical model which simulates the interdependence between the rolling force and the input variables influencing it such as, for instance, width, thickness and temperature of the rolling stock. Estimates are used for the input variables to the extent that any measured values are not yet available. As soon as the rolling stock has entered the mill train, measurements are taken of the rolling force and of the input variables. The measured values obtained are processed (e.g., statistically within the scope of a recalculation), and are then used for adapting the model, while using a neural network, to the recalculated variables (i.e., to the actual condition of the process).

Despite the adapting of the model of the process, the quality of the calculation of the rolling force, however, depends above all on the quality of the model assumptions. These model assumptions, as a rule, are arrived at with difficulty and can be greatly subject to errors. Therefore, there is a need for a method for the presetting of a controlled process which is not dependent on the establishing of model assumptions.

SUMMARY OF THE INVENTION

This and other needs are satisfied by the method and control device of the present invention. In the case of the process of the type indicated above, the input variables are fed prior to the start of the process to a neural network having variable network parameters for the precalculating of the process parameter. The process parameter and the input variables are measured during the process sequence and the measured input variables are fed to the neural network. After the process sequence, the deviation between the network response obtained in this manner and the measured process parameter are utilized for the adaptation of the network parameters to reduce this deviation. Accordingly, the corresponding control device has a neural network having variable network parameters for the adaptive simulating of the interdependence between the input variables and the process parameter.

Unlike the method described above, the precalculation of the process parameter takes place directly in a neural network which is self-learning due to the adapting of the network parameters without it being necessary to make model assumptions for the presetting of the system which controls the process. As compared with previous methods, it is possible in this connection to obtain a significant improvement in the quality of the precalculation.

To assure a real-time adaptation of the network parameters to the time-variant technical process (i.e., a process which changes from sequence to sequence), the adaptation of the network parameters takes place on-line in that, after each process sequence, the measured values for the input variables and the process parameter obtained during the sequence are utilized for the adaptation of the network parameters. The opposite of this would be an off-line adaptation in which the measured values from several process sequences are first collected to form a measured value set which is then used as a whole for the adaptation of the network.

In accordance with a further embodiment of the invention, prior to the start of the very first process sequence (i.e., prior to placing the controlled system in operation), and based on physical model assumptions derived from randomly preset values for the input variables, corresponding values are determined for the process parameter and a pre-adaptation of the neural network is carried out with these values. In this manner, prior knowledge of the relationship between the input variables and the process parameter to be simulated by the neural network is introduced into the network before the start of the process sequences so that only corrections need be made upon the subsequent adaptation of the network parameters during the process sequences. This adaptation takes place preferably on-line. In this manner, the adaptation process is accelerated.

The method of the present invention can be used in industrial processes in which the process parameters which are used for the presetting of the system to be controlled depend on input variables, which can be described by algorithms within the scope of a model assumption only very insufficiently and expensively. In this connection, the input variables scatter strongly and can only be imprecisely detected. Also, process parameters are preferably precalculated by the method of the invention in the field of rolling technology, in particular the rolling force. In this case, for the precalculation of the rolling force in a roll stand, the relative decrease in the thickness of the rolling stock in the stand, the entrance temperature of the rolling stock, the tension in the rolling stock in front of the stand, the tension of the rolling stock behind the stand, the radius of the rolls as well as the width and thickness of the rolling stock in front of the stand are used as input variables.

The precalculating of the process parameter as a function of the input variables takes place advantageously in the manner that the input variables, which define a multi-dimensional input space corresponding to their number, are linked, to form the process parameter to be precalculated, by a linear linkage of Gaussian functions (Gaussian curves). These Gaussian functions are, in each case, multi-dimensional corresponding to the dimension of the input space, having variable centers, widths and amplitudes. In this connection, upon each adaptation step, the Gaussian function whose center is closest to the point defined by the measured input variables in the input space, is shifted by a predetermined step size in the direction of this point and as a function of the deviation between the network response generated by the network with the shifted Gaussian function for the measured input variables and the measured process parameter. The widths of the Gaussian functions and the amplitude of the shifted Gaussian function are adapted with preset step sizes in order to reduce the deviation.

In this case, the fact that the input variables of the network are very faulty and subject to noise in the case of technical processes such as in a rolling mill is taken into account. Therefore, the input variables can be measured in part only indirectly and are subject to relatively rough estimates. The Gaussian functions (Gaussian curves) simulate the error distribution of each input variable. This distribution is assumed to be of Gaussian type, in which case the shifting of the Gaussian function closest to the recalculated input variables leads to a density distribution of the centers of the Gaussian functions in the input space which reflects the distribution of the measured input variables which have occurred. Since the amplitude has changed of the exclusive, closest Gaussian function, once values for the process parameter have been determined by the network for given value combinations of the input variables, such values are not forgotten, even if the occurrence of these combinations dates back some time.

From J. Moody, Ch. Darken: "Fast learning in networks of locally-tuned processing units" Neural Computation, 1989, No. 1, pages 281 to 294, a comparable learning process for neural networks is shown where Gaussian curves are also shifted with the center which is closest to the point defined by the input variables in the input space. However, in that process, both the amplitudes and the widths on all Gaussian functions are modified.

In the method according to the present invention, Gaussian functions are preferably used which exhibit in each case the same widths within each individual dimension of the input space. In this manner, the assumption is taken into account that the error distribution of the input variables may be different for different input variables but that for each input variable it is independent of its value at the time.

The neural network used, which is especially suitable for the processing of very faulty input variables, has an input layer with one input element in each case for each input variable. Following the input layer, a first hidden layer is arranged comprising elements having, in each case, Gaussian function-like response behavior. Following the first hidden layer, a second hidden layer is arranged having two summing elements, one for the weighted and one for the unweighted summation of the responses of the elements of the first hidden layer. An output layer is provided having an output element for the formation of the process parameter to be precalculated correlating to the responses supplied by the summing elements.

According to the present invention, a control device is provided having corresponding means for carrying out the method of the invention, which can include a correspondingly programmed computing unit.

DETAILED DESCRIPTION.

Figure 1:
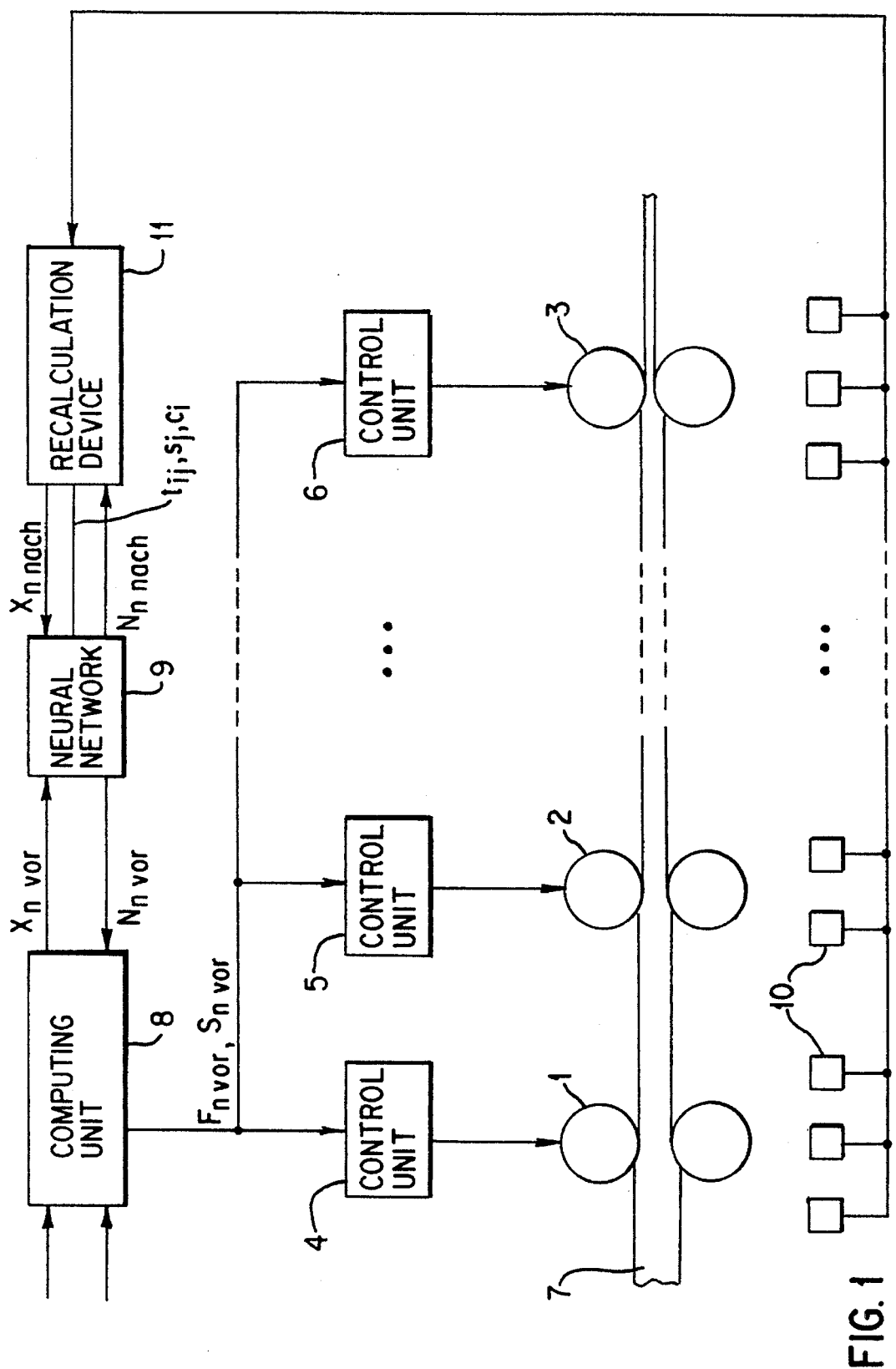
FIG. 1 is a block diagram for the control device of the present invention.

Referring to FIG. 1, a mill train is shown in a very simplified manner having three roll stands n (where n=1, 2, 3). Associated with each of the stands 1, 2 and 3 is one open-loop and closed-loop control unit 4, 5 and 6 for adjusting the thickness of the rolling stock 7 passing through. In this example, the required rolling force $F_n$ on the stand n is determined by the hardness of the rolling stock 7 and by the following seven input variables: the relative decrease in thickness $E_n$ of the rolling stock, the entrance temperature $T_n$ of the rolling stock, the forward pull $Z_n$ in front of the stand n, the backward pull $Z_{n+1}$ in the rolling stock behind the stand n, the roll radius $R_n$, the strip width $B_n$ and the entrance thickness $D_n$ of the rolling stock in front of the stand n. The rolling force $F_n$ must be predicted before the rolling stock 7 enters the mill train. For this reason, some of the variables which determine the rolling force $F_n$ on the stand n, such as the entrance temperature $T_n$ or the entrance thickness $D_n$, cannot be measured but can only be estimated on the basis of model assumptions. This precalculation takes place in a computing unit 8 which is of a higher rank than the control units 4, 5 and 6. Primary data and setpoint values such as the desired final strip thickness are supplied on the input side of this computing unit 8. The variables are precalculated in this manner, and input vector $x_{n\ vor}$ of the input variables for the individual stands n is fed to a unit 9 which is associated with the computing unit 8 and has a neural network implemented therein.

The neural network, which has already been pre-adapted (as described below), produces from the input variables fed to it in each case one predictive value $N_n$ for the rolling force $F_n$ which is fed to the computing unit 8. The computing unit 8 produces for each individual control unit 4, 5 and 6 a preadjustment and/or setpoint value indication in the form of a precalculated adjustment (load-free roll spacing) $s_{n\ vor}$ and rolling force $F_{n\ vor}$ for each individual roll stand n, n=1, 2, 3. As soon as the rolling stock 7 has entered the mill train and the rolling has commenced, additional measurements can be effected by sensors 10 arranged along the mill train. These measurements permit, in a subsequent device for the recalculation 11, a substantially more precise determination of the input variables $E_n$, $T_n$, $Z_n$, $Z_{n+1}$, $R_n$, $B_n$ and $D_n$ as well as the rolling force $F_n$. The recalculation comprises, for instance, a statistical processing of the measured values or a computation of non-existent measured values such as the temperatures of the rolling stock 7 in the individual stands n as a function of the temperature measured in front of the first roll stand and behind the last roll stand. The recalculation finally effects, with the variables recalculated in this manner, an adaptation of the parameters of the neural network and supplies the parameters updated in this manner to the unit 9.

For predicting the required rolling force $F_n$, the neural network approximates the dependence of the rolling force $F_n$ on the input variables $E_n$, . . . , $D_n$, which define a seven-dimensional space corresponding to the number of input variables, by a linear linkage of numerous seven-dimensional Gaussian functions (e.g., 150). In this connection, each Gaussian function is described by the indication of a center t in the seven-dimensional space created by the seven input variables $E_n, \ldots, D_n$, an amplitude c and a width s.

Figure 2:
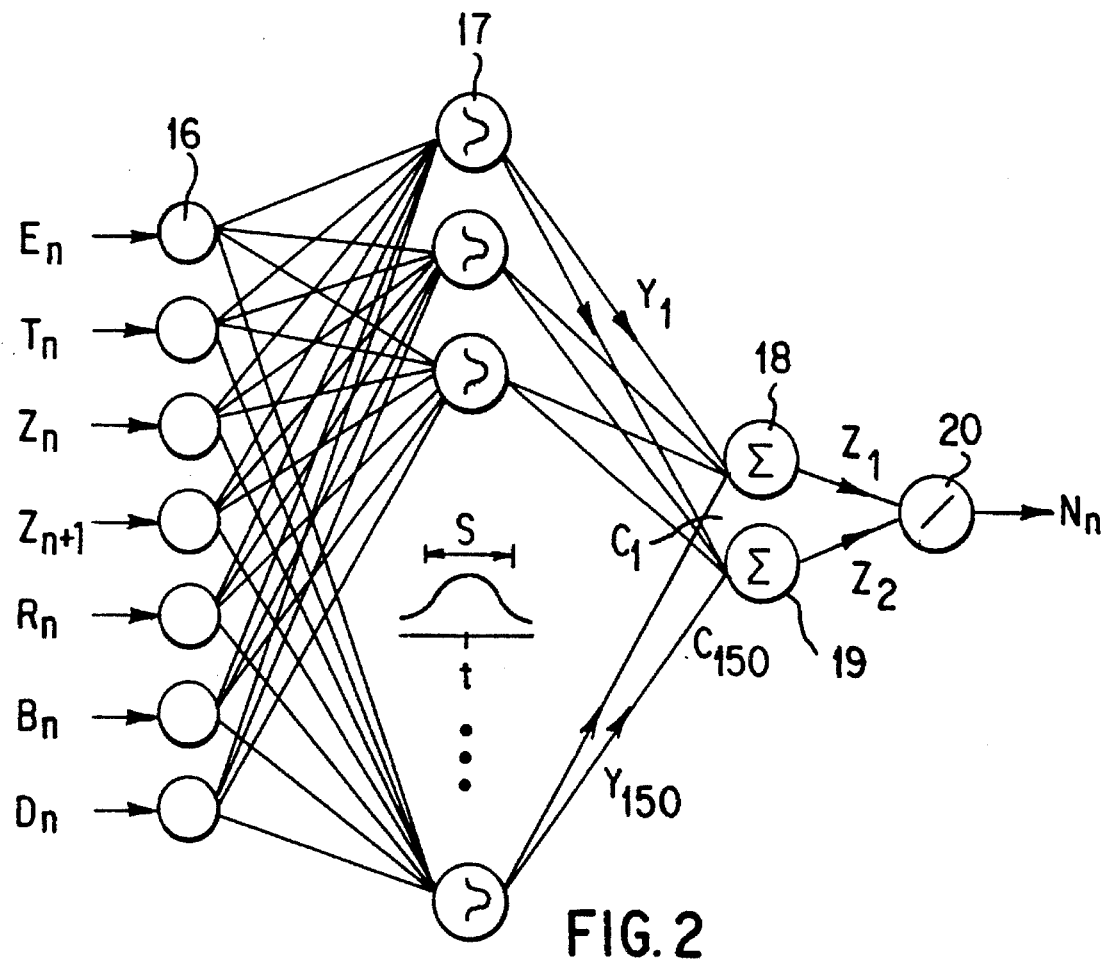
FIG. 2 is an example of a neural network used in the control device of FIG. 1.

In the present example, the unit 9 contains a structured forward-coupled network which comprises four layers and is shown in FIG. 2. An input layer has in each case one input element (neuron) 16 for each input variable $E_n, T_n, Z_n, Z_{n+1}, R_n, B_n$ and $D_n$. A first hidden layer is arranged following this input layer comprising elements 17, each having a response behavior of the Gaussian function type. The first hidden layer is followed by a second hidden layer comprising two summing elements 18 and 19. Summing element 18 sums the responses $Y_i$, i=1, ..., 150 of the individual elements 17 of the first hidden layer in unweighted manner, while summing element 19 sums up each of the responses $Y_i$ multiplied by a weight factor $c_i$. An output layer is arranged following the second hidden layer and comprises an output element 20 which forms the ratio of the responses $z_1$ and $z_2$ supplied by the summing elements 18 and 19 and supplies the precalculated rolling force $F_{n\ vor}$ as output value $N_n$ of the network.

Before the seven input variables $E_n, \ldots, D_n$ are fed to the neural network, they are each first standardized to a value range between zero and one. This results in equating from the start input variables which have small numerical values, such as the relative decrease in thickness $E_n$, to input variables which have high values, such as the entrance temperature $T_n$, and enter the computation and adaptation process with the same weighting. The seven standardized input variables can be combined in a seven-dimensional vector $x=(x_1, \ldots, x_7)=(E_n, T_n, Z_n, Z_{n+1}, R_n, B_n, D_n)$ which is fed to the elements 16 of the input layer. In the following description of the neural network, the subscript n for the $n^{th}$ stand is omitted for the input vector $x_n$ for simplification. If i is the $i^{th}$ element 17 of the first hidden layer, then the latter generates the response value $$y_i = \exp\left(-\sum_{j=1}^{7} [s_j^2 \cdot (x_j - t_{ij})^2]\right).$$

The response behavior of each individual element 17 of the first hidden layer thus describes a seven-dimensional Gaussian curve with a center at the point $t_i=(t_{i1}, \ldots, t_{i7})$. The width $s_j$ of the Gaussian curve can be different in each of the seven input dimensions, but in the corresponding dimension it is the same for all Gaussian curves i, i=1, ..., 150. The reason for this is the assumption that the error distribution of the individual input variables $E_n, \ldots, D_n$ can be different for different input variables, but it is independent of the instantaneous value of the input variable in question.

The two summing elements 18 and 19 of the second hidden layer each receive the 150 output values $y_i$ of the elements 17 of the first hidden layer as inputs. Summing element 18 of the second hidden layer carries out a simple summation of all responses $y_i$ and supplies the following output value $$z_1 = \sum_{i=1}^{150} y_i.$$

Summing element 19 carries out a summation of all responses $y_i$ which are weighted with the factors $c_i$ and supplies the following result $$z_2 = \sum_{l=1}^{150} (c_i \cdot y_i).$$

Finally, the output element 20 forms the ratio from the two responses $z_1$ and $z_2$ of the second hidden layer and thus supplies, with the network response $N_n=z_2/z_1$, a prediction value for the rolling force $F_n$ of the corresponding roll stand n. The network output $N_n$ thus depends on the parameters of the network $t_i=(t_{i1}, \ldots t_{i7})$, $s=(s_1, \ldots, s_7)$ and $c=(c_1, \ldots, c_{150})$, which are designated as weightings. They must be selected in such a manner that the prediction error of the network is minimized.

Figure 3:
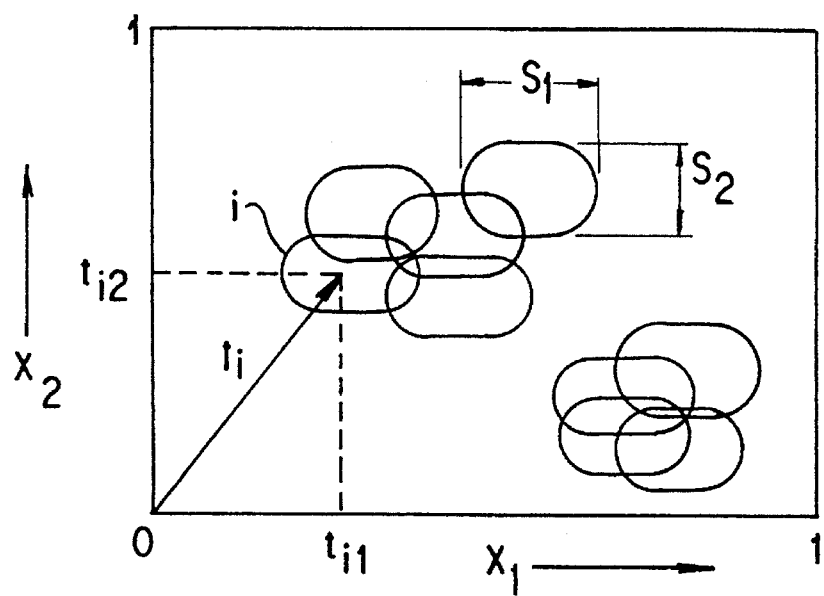
FIG. 3 is a representation of the input space effected by the neural network, which has been simplified by reducing it to two dimensions.

An illustrative interpretation of the response behavior of the neural network is shown in FIG. 3. In the application considered here (i.e., the prediction of the rolling force), the input space of the network, which is formed by all input vectors $x=(x_1, \ldots, x_7)$ possible, is seven-dimensional due to the seven input variables $E_n, \ldots, D_n$. Due to the standardization of the individual input variables to values between zero and one, the input space is defined by a seven-dimensional standard cube. To simplify its representation, only two of the seven dimensions are shown in FIG. 3., thus defining a square. Each of the i (i=1, ..., 150) elements 17 of the first hidden layer represents in the input space a Gaussian curve i with center at the point $t_i$ which forms a local covering of the input space there. The first hidden layer produces a superposition of a total of 150 Gaussian curves i and thus permits a variable, global covering of those spatial areas of the input space in which the actually occurring input vectors x lie. In FIG. 3, the Gaussian curves i are shown in the form of ellipses which extend in the direction $x_1$ and/or $x_2$ indicating the corresponding width $s_1$ or $s_2$ of the Gaussian curves i in the corresponding dimension.

The factors $c_i$ which are assigned to the responses $y_j$ of the elements 17 of the first hidden layer in the summing element 19 can be designated as that force value which the network would supply if the element i would be the only element 17 of the first hidden layer. In the case of several elements 17, the force values $c_i$ of all elements 17 are averaged, the force value $c_i$ of an element 17 being weighted stronger the closer the corresponding Gaussian curve center t is to the input vector x. The weighting factor, which is formed by the response $y_i$ of the $i^{th}$ element 17 of the first hidden layer is greater the smaller the distance between x and $t_i$. A standardization of the weighted averaging takes place in the output element 20.

A variation of the input vector x leads to a change in the network output $N_n$ because the distances of the input vector x from the Gaussian curve centers $t_i$ change relative to each other. If an input vector x is at a great distance from all Gaussian curve centers $t_i$, then the network reacts with only very little sensitivity to the variation of the input vector x since the distances of the input vector x from the Gaussian curve centers $t_i$ change, in this case, only very slightly relative to each other. In order to show complex relationships with the network, which may require substantial changes in the output value $N_n$ upon a slight change in the input variables $E_n, \ldots, D_n$, it is necessary for none of the input vectors x which occur to have a great distance from all Gaussian curve centers $t_i$. This is achieved by a homogeneous distribution of the Gaussian curve centers $t_i$ in those spatial areas of the input space in which input vectors x occur. The actually relevant spatial areas must therefore be covered uniformly by the Gaussian curves i. How this is achieved and how the remaining parameters $c_i$ and $s_j$ of the network are adapted is explained below.

For the prediction of the rolling force, the precalculated input variables $E_n$, $T_n$, $Z_n$, $Z_{n+1}$, $R_n$, $B_n$ and $D_n$ are entered into the network in standardized form as input vector x or $x_n$ for the $n^{th}$ stand. For the adaptation of the network parameters $t_{ij}$, $s_j$ and $c_i$, the measured and recalculated input variables $X_{n\ nach}$ are used, however, for reasons of accuracy. As soon as a strip has been rolled, the recalculated input variables are available together with the recalculated rolling force $F_n$ which are combined in one data point $(X_{n\ nach}, F_{n\ nach})$. This data point is then used for the adaptation of the network parameters $t_{ij}$, $s_j$ and $c_i$.

For the distribution of the Gaussian curve centers $t_i$ over those regions in which input vectors x occur, in each case shifting takes place on-line (i.e., upon each new data point) of that Gaussian center $t_i^*$ which is closest to the recalculated input variables $x_{n\ nach}$. The shifting of $t_i^*$ takes place in the direction of $x_{n\ nach}$ with a step size of 5%, for example, whereby the new center $t_i^*{}_{new}$ results with $t_i^*{}_{new} = t_i^*{}_{old} + 0.05 \cdot x_{n\ nach} - t_i^*{}_{old}$. All Gaussian curve centers $t_i$, except for the one closest to $x_{n\ nach}$ remain unchanged. The shifting of the Gaussian curve centers $t_i$ leads to a density distribution of the Gaussian curve centers $t_i$ in the input space which reflects the distribution of the recalculated input variables $x_n$ nach which have occurred. As a result, Gaussian curve centers $t_i$ are present in those and only in those regions of the input space in which input vectors $x_{n\ nach}$ occur.

In addition to the centers $t_i$ of the Gaussian curves, the amplitudes of the Gaussian curves must also be adapted via the parameters $c_i$, and the widths of the Gaussian curves must be adapted via $s_j$. This takes place through the method of the gradient descent. It must be taken into account, in this connection, that some configurations occur only very rarely in the input variables $E_n, \ldots, D_n$ (possibly only one more occurrence after several months). On the other hand, other configurations occur frequently and, possibly, many times in succession. Although in such cases data points from the same area of the input space are presented to the network over a long period of time, the network nevertheless remains in the position to adequately precalculate the rolling forces $F_n$ for rarely rolled strips and, therefore, not to forget the rolling forces $F_n$ for such strips.

In order to assure this, the gradient descent takes place for the adaptation of the amplitudes $c_1$ of the Gaussian curves only in the weightings of those Gaussian curves i* whose center $t_i^*$ is closest to the input vector $x_{n\ nach}$. As a result, Gaussian curves remain unchanged in areas of the input space in which no input vectors $x_{n\ nach}$ occur for a lengthy period of time. However, if an input vector $x_{n\ nach}$ occurs many times in succession, then only the same Gaussian curve will always be adapted, namely the closest one.

The gradient descent in $c_i^*$ and $s_j$ takes place on the quadratic error function $Eq = (F_{n\ nach} - N_{n\ nach})^2$.

In this case, $N_{n\ nach}$ is the response of the network with already adapted distribution of the Gaussian curve centers so that the gradient descent is based on the current Gaussian curve center distribution. $F_{n\ nach}$ designates, in this case, the measured rolling force (i.e., the rolling force which was actually required and therefore had to be adapted). For adaptation steps for $c_i^*$ and $s_j$, due to the minimizing of the quadratic error function Eq, results in $$\Delta c_i^* = l_c \cdot (F_{n\ nach} - N_{n\ nach}) \cdot \delta N_{n\ nach}/\delta c_i$$
$$= l_c \cdot (F_{n\ nach} - N_{n\ nach}) \cdot y_i^*/z_i$$

and $$\Delta s_j = l_s \cdot (F_{n\ nach} - N_{n\ nach}) \cdot \delta N_{N\ nach}/\delta s_j,$$

where $l_c$ and $l_s$ indicate the adaptation step sizes or learning rates in question. The learning rates are so selected in the case of each adaptation process that, by the carrying out of the two adaptation steps for $c_i^*$ and $s_j$, there is obtained a pre-established percentage improvement in the rolling force prediction for the input vector $x_{n\ nach}$.

By a preadaptation of the network, the parameters $t_{ij}$, $c_i$ and $s_j$ of the network can be set to values with which the network precalculates, before the start of the actual training, at least approximately meaningful rolling forces $F_n$. For this purpose, by a rolling force model which describes the interdependence between the input variables $E_n$, $T_n$, $Z_n$, $Z_{n+1}$, $R_n$, $B_n$ and $D_n$ and the rolling force $F_n$ in the form of an algorithm, at least approximately meaningful rolling forces are calculated which are used for the preadaptation of the network. As a result of this preadaptation, the network initially simulates the rolling force model so as to adapt, proceeding from this starting position via the training with real data from the mill train, the actual physical context. In this connection, randomly standardized input variables $x_n = (E_n, \ldots, D_n)$ are generated for the preadaptation of the network. With the rolling force model, the rolling force $F_n$ which corresponds to the input variables $x_n$ is calculated. $x_n$ and $F_n$ thus constitute an artificially generated data point by which the parameters of the network are adapted via the adaptation rules explained above. In this manner, any desired number of such artificial data points can be generated which are randomly distributed over the entire space of the values for the input variables which are possible in practice. In the course of the preadaptation, the network simulates the physical rolling force model in this space and thus integrates the prior knowledge contained in the physical rolling force model.

What is claimed is:

1. A method for controlling a process in a controlled system having at least one process sequence, comprising:

supplying a plurality of input variables to a neural network having variable network parameters for precalculating a process parameter before the start of a process sequence;

presetting a controlled system at the start of each process sequence as a function of said precalculated process parameter;

measuring values for said input variables and said process parameter during said process sequence;

supplying said measured input variable values after said process sequence to said neural network;

calculating in said neural network a network response based on the measured input variables;

calculating a deviation between said network response and said measured process parameter; and adapting said network parameters in said neural network to reduce said deviation wherein said adapting step takes place on-line, such that after each measuring step the measured input variable values and process parameter obtained are used for adaptation of the network parameters.

2. The method of claim 1, further comprising:

determining corresponding values for said process parameters based on physical model assumptions, prior to the first process sequence, from randomly preset values for the input variables; and preadapting said neural network with said corresponding values.

3. The method of claim 2, wherein said process parameter is a rolling force on a rolling stand in a mill train.

4. The method of claim 3, wherein said input variables include a relative decrease in thickness of a rolling stock in the stand, an entrance temperature of the rolling stock, a tension in the rolling stock in front of the stand, a tension in the rolling shock behind the stand, a radius of the rolling stock, a width of a roll in the roll stand, and a thickness of the rolling stock in front of the stand.

5. A method for controlling a process in a controlled system having at least one process sequence, comprising:

supplying a plurality of input variables to a neural network having variable network parameters for precalculating a process parameter before the start of a process sequence, said process parameter being a rolling force on a rolling stand in a mill train and said input variables include a relative decrease in thickness of a rolling stock in the stand, an entrance temperature of the rolling stock, a tension in the rolling stock in front of the stand, a tension in the rolling stock behind the stand, a radius of the rolling stock, a width of a roll in the roll stand, and a thickness of the rolling stock in front of the stand, said input variables define a multi-dimensional input space according to their number, said input variables are linked by linear linkage of Gaussian functions to form the process parameter to be precalculated, each of said Gaussian functions are multi-dimensional corresponding to a dimension of the input space, each of said Gaussian functions has a variable center, width, and amplitude;

presetting a controlled system at the start of each process sequence as a function of said precalculated process parameter;

measuring values for said input variables and said process parameter during said process sequence;

supplying said measured input variable values after said process sequence to said neural network;

calculating in said neural network a network response based on the measured input variables;

calculating a deviation between said network response and said measured process parameter;

adapting said network parameters in said neural network to reduce said deviation, said adapting step takes place on-line, such that after each measuring step the measured input variable values and process parameter obtained are used for adaptation of the network parameters;

determining corresponding values for said process parameters based on physical model assumptions, prior to the first process sequence, from randomly preset values for the input variables;

preadapting said neural network with said corresponding values shifting one Gaussian function upon each adaptation step whose center is closest to the point defined in the input space by the measured input variables, said shifting step taking place by a preset step size in a direction toward said point; and adapting the width of the Gaussian functions and the amplitude of the shifted Gaussian function with preset step sizes as a function of, and in order to reduce, a deviation between the network response generated by the network with the shifted Gaussian function for the measured input variables and the measured process parameter.

6. The method of claim 5, wherein said Gaussian functions are used which exhibit, in each case, the same widths within each individual dimension of the input space.

7. The method of claim 6, wherein said neural network includes an input layer with one input element for each of said input variables, a first hidden layer following said input layer comprising elements having a response behavior of a Gaussian function type, a second hidden layer arranged behind said first hidden layer having first and second summing elements, said first summing element for weighted summation of the responses of the elements of the first hidden layer and said second summing element unweighted summation of the responses of the elements of the first hidden layer, and an output layer having an output element for forming the process parameter to be precalculated as a ratio of the summed responses supplied by the summing elements.

8. A control device for controlling a process in a controlled system having at least one process sequence, comprising:

a device which presets the system as a function of a precalculated process parameter which exhibits a system-induced dependence on input variables; and a neural network having variable network parameters for adaptive simulation of an interdependence between the input variables and the process parameter before the start of a process sequence wherein said network parameters are adapted on-line, such that after each measuring step the measured input variable values and process parameter obtained are used for adaptation of the network parameters.

9. The control device of claim 8, wherein values for said input variables and said process parameter are measured during said process sequence, such that said measured input variable values are supplied to said neural network after said process sequence, wherein a deviation between a network response based on the measured input variables and the measured process parameter is calculated and said network parameters in said neural network are adapted to reduce said deviation.

10. The control device of claim 9, wherein corresponding values for said process parameters based on physical model assumptions are determined, prior to the first process sequence, from randomly preset values for the input variables, and said neural network is preadapted with said corresponding values.

11. The control device of claim 10, further comprising:

a mill train including at least one rolling stand, such that said process parameter is a rolling force on said at least one rolling stand in said mill train.

12. The control device of claim 11, wherein for precalculating the rolling force on said at least one roll stand, said input variables include a relative decrease in thickness of a rolling stock in said at least one stand, an entrance temperature of the rolling stock, a tension in the rolling stock in front of said stand, a tension in the rolling stock behind said stand, a radius of the rolling stock, a width of a roll in said roll stand, and a thickness of the rolling stock in front of said stand.

13. A control device for controlling a process in a controlled system having at least one process sequence, comprising:

a device which presets the system as a function of a precalculated process parameter which exhibits a system-induced dependence on input variables, said input variables define a multi-dimensional input space according to their number, said input variables are linked by linear linkage of Gaussian functions to form the process parameter to be precalculated, each of said Gaussian functions are multi-dimensional corresponding to a dimension of the input space, each of said Gaussian functions has a variable center, width, and amplitude, such that one Gaussian function upon each adaptation step is shifted whose center is closest to the point defined in the input space by the measured input variables, said shifting step taking place by a preset step size in a direction toward said point, such that the width of the Gaussian functions and the amplitude of the shifted Gaussian function are adapted with preset step sizes as a function of, and in order to reduce, a deviation between the network response generated by the network with the shifted Gaussian function for the measured input variables and the measured process parameter;

a neural network having variable network parameters for adaptive simulation of an interdependence between the input variables and the process parameter before the start of a process sequence, values for said input variables and said process parameter are measured during said process sequence, such that said measured input variable values are supplied to said neural network after said process sequence, wherein a deviation between a network response based on the measured input variables and the measured process parameter is calculated and said network parameters in said neural network are adapted to reduce said deviation, said network parameters are adapted on-line, such that after each measuring step the measured input variable values and process parameter obtained are used for adaptation of the network parameters, wherein corresponding values for said process parameters based on physical model assumptions are determined, prior to the first process sequence, from randomly preset values for the input variables, and said neural network is preadapted with said corresponding values; and a mill train including at least one rolling stand, such that said process parameter is a rolling force on said at least one rolling stand in said mill train, wherein for precalculating the rolling force on said at least one roll stand, said input variables include a relative decrease in thickness of a rolling stock in said at least one stand, an entrance temperature of the rolling stock, a tension in the rolling stock in front of said stand, a tension in the rolling stock behind said stand, a radius of the rolling stock, a width of a roll in said roll stand, and a thickness of the rolling stock in front of said stand.

14. The control device of claim 13, wherein said Gaussian functions are used which exhibit, in each case, the same widths within each individual dimension of the input space.

15. The control device of claim 14, wherein said neural network further comprises:

an input layer having one input element for each of said input variables;

a first hidden layer following said input layer comprising elements having a response behavior of a Gaussian function type;

a second hidden layer arranged behind said first hidden layer having first and second summing elements, said first summing element for weighted summation of the responses of the elements of the first hidden layer and said second summing element unweighted summation of the responses of the elements of the first hidden layer; and an output layer having an output element for forming the process parameter to be precalculated as a ratio of the summed responses supplied by the summing elements.

* * * * *